Patented Oct. 10, 1950

2,525,599

UNITED STATES PATENT OFFICE 2,525,599

READY-MIXED FLOUR

Elmer G. Gustavson, Clarendon Hills, Ill., assignor to The Quaker Oats Company, Chicago, Ill., a corporation of New Jersey No Drawing. Application July 8, 1947, Serial No. 759,715

4 Claims. (Cl. 99—94)

This invention relates to ready-mixed flours for use in the production of cakes, muffins, breads, cookies and the like and to the method of their preparation.

When cakes are produced in the home by ordinary methods a rather large number of different ingredients are required, an objectionable feature not only because a large stock of the individual ingredients is required, but also because the amount of each must be carefully measured as too little or too much of any constituent will produce unsatisfactory results. Numerous attempts in the past have been made to surmount this difficulty by the preparation of ready-mixed flours. While such preparations have eliminated the necessity of measuring the individual ingredients for a cake, the resulting product has not been wholly satisfactory because of its tendency to deteriorate in storage.

It is a primary object of the present invention to prepare a ready-mixed flour which can be stored for long periods of time without deterioration of flavor or volume characteristics of the products made from such flour mixes. Another object of this invention is the production of a ready-mixed flour which requires only the addition of water followed by baking to convert it to a cake, muffin, bread, or cookie product. Still another object of the present invention is the production of an article of commerce which will produce cake products possessing excellent volume characteristics.

In general, the objects of my invention may be obtained by dehydrating the flour used in the mixture to a moisture content of preferably about 2–8 per cent prior to its use in the mixture. The drying of the flour may be accomplished either at atmospheric pressure or under a vacuum, but which ever method is used it must be done quickly as subjecting flour to a high temperature for a period of any but a minimum time will have a detrimental effect upon it. In fact, it is common belief in the baking industry that flour should not be heated at all because of the danger of degrading the gluten as demonstrated by H. Snyder, "Studies on Bread and Bread-making," U. S. Department Agriculture Office Exp. Stat., Bul. 101, who found that bread baked from a flour which had been heated to 100 C. was inferior, having a smaller volume and a darker color than bread baked from a flour stored at room temperature. I have found, however, that if flour is rapidly dried and quickly cooled in accordance with my invention no damage results and in addition, highly desirable qualities are imparted to it.

Flour will not dry of itself by storing it in a room, under ordinary circumstances, consequently some type of drying equipment is required to dry the flour to the desired moisture content. A drier which I have found convenient and satisfactory for this purpose is the type known as a rotary steam tube drier which consists essentially of a drying cylinder installed at an angle from the horizontal fitted with baffles and steam pipes for heating purposes extending through the cylinder. In operation the cylinder, baffles and steam pipes revolve as a unit. The material to be dried is added at the high end of the drier and as the cylinder rotates the material moves toward the low end where it is discharged as a more or less dried product. Generally, to facilitate drying, a current of warm air is passed through the drier. When such a drier is used a preferred method of operation was as follows: Flour was added to the machine which is heated with steam at any pressure between 25–100 pounds per square inch preferably within the range 50–100 pounds per square inch at such a rate that any given quantity of flour remained in the drier for a period of 5–15 minutes depending upon the temperature used. If steam at a pressure of 25 pounds per square inch was employed, it may be necessary that the flour remain in the drier the entire 15 minutes; if, on the other hand, steam at 100 pounds per square inch was used, 5 minutes will be sufficient. Higher steam temperatures make it possible to decrease the drying time further. Immediately after drying, the flour was quickly cooled by any suitable means such as, passing it through an aspirator.

As a specific example, 150 parts of flour moisture content 13 per cent was added to a rotary steam tube drier which was heated with steam at a pressure of 50 pounds per square inch. The flour was added and the drier was rotated at such a rate that none of the flour remained in the drier for a period exceeding 10 minutes. From the drier, the flour which now had a moisture content of 4.4 per cent was passed through an aspirator which quickly cooled it.

The following example illustrates the preparation of a ready-mixed flour which may be used in accordance with the present invention wherein parts indicated are parts by weight.

| | Parts |
|---|---|
| Dehydrated flour | 40.20 |
| Sugar | 42.50 |
| Shortening | 10.98 |
| Powdered skim milk | 2.00 |
| Powdered whole egg | 2.00 |
| Leavening agent | 1.60 |
| Salt | 0.70 |
| Vanillin | 0.02 |

The foregoing ingredients may be mixed in any order, but I prefer to place the shortening and sugar in a bowl of a mixer and thoroughly agitate the two. While these two constituents are being mixed the dehydrated flour, powdered skim milk, powdered whole egg, leavening agent and flavoring materials are added. After the ingredients are added the agitation is continued until all are thoroughly mixed. The amount of each ingredient is not to be considered as restricted solely to the foregoing percentage as anyone may be varied or even replaced by another constituent. For example, cinnamon, ginger or other spices may be used in lieu of vanillin. By using ginger, molasses and other spices in the flavoring materials a gingerbread may be prepared. As another variation cornmeal muffins or oatmeal cookies may be prepared by replacing a portion of the dried flour with cornmeal or rolled oats. When using the latter two constituents best results are obtained if they are dehydrated to a moisture content of 2–7 per cent prior to incorporating them in the mixture.

As to why a reduction in the moisture content will produce these desirable results is obscure and I am not prepared to adopt a theory explaining the reaction. A reasonable expectation would be to find a direct variation between carbon dioxide content and volume. Such has not been the case. In some experiments the volume has increased, in others it has decreased and in others there has been no change at all with a decrease in carbon dioxide content. Likewise, there does not seem to be any clear relationship between carbon dioxide content and moisture. All that can be said is that a flour containing 10–13% moisture does not give satisfactory results in a mix after storage, but if the moisture content of the flour has been reduced to 2–8 per cent prior to incorporating it in the mix, the resulting mix may be stored for periods up to one year and longer at about 70° F. and still produce a satisfactory cake.

The table given below summarizes the results of baking tests in which mixtures containing the two flours have been stored for varying periods of time and then baked.

Specifically, a cake prepared from a mix containing a dehydrated flour showed less than a ten per cent decrease in volume after the mix had been in storage for one year as compared to the volume of a cake prepared from a fresh mix. Under the same conditions a mix containing a non-dehydrated flour showed a decrease of over twenty per cent. As for flavor the difference was even more marked. Samples of cake prepared from the two mixes were submitted to taste experts and it was their unanimous opinion that the cake prepared from the mix containing the dehydrated flour was far superior to the other.

*Table*

| Per cent moisture of flour used in mix | 4.4 | | 7.2 | | 13.2 | |
|---|---|---|---|---|---|---|
| Storage period, Months | Volume | Flavor | Volume | Flavor | Volume | Flavor |
| 0 | 1,617 | Good | 1,645 | Good | 1,510 | Good. |
| 1 | 1,515 | ---do--- | 1,515 | ---do--- | 1,325 | Do. |
| 2 | 1,535 | ---do--- | 1,500 | ---do--- | 1,435 | Do. |
| 3 | 1,500 | ---do--- | 1,600 | ---do--- | 1,350 | Do. |
| 6 | 1,450 | ---do--- | 1,470 | ---do--- | 1,210 | Off. |
| 12 | 1,530 | ---do--- | 1,585 | ---do--- | 1,260 | Do. |

Volume determined by rapeseed displacement method in c. c.

Having now described and illustrated one form of my invention, I wish it to be understood that my invention is not to be limited to the specific details given therein, except in so far as such limitations are specified in the appended claims.

I claim:

1. The method of producing a ready-mixed flour adapted to be subsequently baked into an edible product, comprising: first, dehydrating flour by heating said flour above 100° C. for a relatively short period of time followed by rapidly cooling said flour; second, mixing shortening and sugar and then adding thereto with mixing said dehydrated flour, powdered skim milk, powdered whole egg, leavening agent and flavoring materials.

2. The method of producing a ready-mixed flour adapted to be subsequently baked into an edible product, comprising: first, dehydrating flour to a moisture content of 2–8 per cent by heating said flour above 100° C. for a period of 5–15 minutes followed by rapidly cooling said flour; second, mixing shortening and sugar and then adding thereto with mixing said dehydrated flour, powdered skim milk, powdered whole egg, leavening agent and flavoring materials.

3. The method of producing a ready-mixed flour adapted to be subsequently baked into an edible product, comprising: first, dehydrating flour to a moisture content of 2–8 per cent by heating said flour at a temperature corresponding to a steam pressure of 25–100 pounds per square inch for a period of 5–15 minutes followed by rapidly cooling said flour; second, mixing shortening and sugar and then adding thereto with mixing said dehydrated flour, powdered skim milk, powdered whole egg, leavening agent and flavoring materials.

4. The method of producing a ready-mixed flour adapted to be subsequently baked into an edible product, comprising: first, dehydrating flour to a moisture content of 4.4 per cent by heating said flour at a temperature corresponding to a steam pressure of 50 pounds per square inch for a period of 10 minutes followed by rapidly cooling said flour; second, mixing shortening and sugar and then adding thereto with mixing said dehydrated flour, powdered skim milk, powdered whole egg, leavening agent and flavoring materials.

ELMER G. GUSTAVSON.

REFERENCES CITED

The following references are of record in the file of this patent:

UNITED STATES PATENTS

| Number | Name | Date |
|---|---|---|
| 1,944,880 | Finkel | Jan. 30, 1934 |
| 1,944,881 | Finkel | Jan. 30, 1934 |
| 2,016,318 | Duff | Oct. 8, 1935 |

FOREIGN PATENTS

| Number | Country | Date |
|---|---|---|
| 11,502 | Great Britain | of 1900 |
| 300,291 | Great Britain | Nov. 12, 1928 |